US012793113B2

(12) United States Patent
Wachi et al.

(10) Patent No.: US 12,793,113 B2
(45) Date of Patent: Nov. 10, 2026

(54) CLOTHING SIZE ACQUISITION SYSTEM, CLOTHING SIZE ACQUISITION PROGRAM, CLOTHING SELECTION ASSISTANCE METHOD, AND COMPUTER-READABLE NON-TRANSITORY STORAGE MEDIUM

(71) Applicant: TANITA CORPORATION, Tokyo (JP)

(72) Inventors: Yuto Wachi, Tokyo (JP); Yasuhiro Kasahara, Tokyo (JP)

(73) Assignee: TANITA CORPORATION, Tokyo (JP)

(*) Notice: Subject to any disclaimer, the term of this patent is extended or adjusted under 35 U.S.C. 154(b) by 423 days.

(21) Appl. No.: 17/524,919

(22) Filed: Nov. 12, 2021

(65) Prior Publication Data

US 2022/0076311 A1 Mar. 10, 2022

Related U.S. Application Data

(63) Continuation of application No. PCT/JP2020/019575, filed on May 18, 2020.

(30) Foreign Application Priority Data

May 20, 2019 (JP) ................................ 2019-094551

(51) Int. Cl.
*G06Q 30/00* (2023.01)
*A41H 1/02* (2006.01)
(Continued)

(52) U.S. Cl.
CPC ........... *G06Q 30/0623* (2013.01); *A41H 1/02* (2013.01); *G01G 19/44* (2013.01)

(58) Field of Classification Search
CPC .............................. G06Q 30/0623; A41H 1/02
See application file for complete search history.

(56) References Cited

U.S. PATENT DOCUMENTS 7,421,306 B2 * 9/2008 Adiseshan ............. G06Q 30/00 705/26.7
10,664,901 B2 * 5/2020 Ohnemus ........... G06Q 30/0601
(Continued)

FOREIGN PATENT DOCUMENTS

CN 102819805 A 12/2012
CN 109741390 A 5/2019
(Continued)

OTHER PUBLICATIONS

Liu, Si, et al. "Hi, magic closet, tell me what to wear!." Proceedings of the 20th ACM international conference on Multimedia. 2012.*
(Continued)

*Primary Examiner* — Kathleen Palavecino
(74) *Attorney, Agent, or Firm* — McDonald Hopkins LLC

(57) ABSTRACT

A clothing size for a customer is estimated based on a plurality of pieces of body composition data each associated with a clothing size indicating the size of clothes worn by the customer and on body composition data of the customer measured by a measuring device, then the appropriateness of the estimated clothing size for the customer is calculated, and a store clerk views the estimated clothing size and appropriateness displayed on a terminal device and assists the customer to select clothes.

12 Claims, 7 Drawing Sheets

(51) Int. Cl.

| | |
|---|---|
| ***G06Q 30/0601*** | (2023.01) |
| *G01G 19/44* | (2006.01) |

(56) References Cited

U.S. PATENT DOCUMENTS

| | | | | |
|---|---|---|---|---|
| 11,062,377 | B1 * | 7/2021 | Piroska | G06Q 30/0631 |
| 2006/0282005 | A1 | 12/2006 | Kasahara et al. | |
| 2009/0210320 | A1 * | 8/2009 | Adelman | G06Q 30/0641 705/26.1 |
| 2011/0099122 | A1 * | 4/2011 | Bright | G06Q 10/067 705/348 |
| 2011/0231278 | A1 * | 9/2011 | Fries | G06Q 30/0621 705/26.5 |
| 2011/0295711 | A1 * | 12/2011 | Mazmanyan | G06Q 30/0631 705/26.7 |
| 2012/0030060 | A1 * | 2/2012 | Lu | G06Q 30/0631 705/26.7 |
| 2012/0030061 | A1 * | 2/2012 | Lu | G06Q 30/0631 705/26.7 |
| 2012/0030062 | A1 * | 2/2012 | Stauffer | G06Q 30/0631 705/26.7 |
| 2014/0025346 | A1 * | 1/2014 | Uchiyama | A61B 5/1072 703/1 |
| 2014/0063056 | A1 * | 3/2014 | Zhong | G06T 11/00 345/633 |
| 2014/0108202 | A1 | 4/2014 | Masuko | |
| 2016/0180447 | A1 | 6/2016 | Kamalie et al. | |
| 2016/0198977 | A1 * | 7/2016 | Eom | A61B 5/02416 600/300 |

FOREIGN PATENT DOCUMENTS

| | | | |
|---|---|---|---|
| JP | 2002-177015 | A | 6/2002 |
| JP | 2004-029909 | A | 1/2004 |
| JP | 2007-265077 | A | 10/2007 |
| JP | 2010-204697 | A | 9/2010 |
| JP | 2013-186490 | A | 9/2013 |
| JP | 2013-210699 | A | 10/2013 |
| JP | 2014-018444 | A | 2/2014 |
| JP | 2016-123589 | A | 7/2016 |
| JP | 2018-124946 | A | 8/2018 |
| KR | 10-1595810 | B1 | 2/2016 |

OTHER PUBLICATIONS

International Search Report issued in Patent Application No. PCT/JP2020/019575 dated Aug. 11, 2020.

Extended European search report issued in European Patent Application No. 20808921.9 dated Jun. 1, 2023.

Japanese Office Action issued in Japanese Patent Application No. 2019-094551 dated Aug. 15, 2023.

Japanese Office Action issued in Japanese Patent Application No. 2019-094551 dated Mar. 26, 2024.

Chinese Office Action issued in Chinese Patent Application No. 202080037650.7 dated Dec. 28, 2024.

* cited by examiner

CLOTHING SIZE ACQUISITION SYSTEM, CLOTHING SIZE ACQUISITION PROGRAM, CLOTHING SELECTION ASSISTANCE METHOD, AND COMPUTER-READABLE NON-TRANSITORY STORAGE MEDIUM

CROSS-REFERENCE TO RELATED APPLICATIONS

This application claims the benefit of Japanese Patent Application No. 2019-94551 filed on May 20, 2019 in Japan, the contents of which are incorporated herein by reference.

TECHNICAL FIELD

The present disclosure relates to a wearable-item size acquisition system, a wearable-item size acquisition program, and a wearable-item selection assistance method.

BACKGROUND ART

The size of clothes or other wearable items that a person wears is determined based on body height, abdominal girth, shoulder width, or other information. This requires a store clerk to measure the abdominal girth, shoulder width, or the like of a purchaser when clothes are purchased at a store, but measuring these items is a troublesome work for a store clerk. It is also difficult for purchasers themselves to measure abdominal girth, shoulder width, or the like without help from others. In contrast, values related to the whole body such as body height and body weight could be measured relatively easily. Clothes, however, are generally worn on the upper or lower body as jackets and pants are, and therefore the size of clothes could not be accurately determined from those measurements related to the whole body.

A device has therefore been developed as disclosed in Japanese Patent Laid-Open Application No. 2016-123589 that acquires body shape data indicating the three-dimensional shape of the outside shape of the body and acquires physical information of a subject.

The physical information acquisition device disclosed in Japanese Patent Laid-Open Application No. 2016-123589 generates a parallel projection image that is a parallel projection of the three-dimensional shape of the body of a subject represented by body shape data, sets on the body shape data one or more specific Y positions at which physical information is to be acquired, and acquires as an item of physical information of the subject the length of the parallel projection image at the specific Y positions in a direction perpendicular to the Y-axis.

SUMMARY OF THE INVENTION

Such a method of measuring the three-dimensional shape of the body as disclosed in Japanese Patent Laid-Open Application No. 2016-123589, however, would be troublesome as it requires many regions to measure and time for measurement and arithmetic processing, and could not allow an accurate acquisition of body-shape information of a person to be measured if the person wears clothes. Measuring the three-dimensional shape of the body also requires, for example, a 3-D scanner or the like capable of scanning a person, requiring a new capital investment.

A purpose of the present disclosure made in view of the above is to provide a wearable-item size acquisition system, a wearable-item size acquisition program, a wearable-item selection assistance method, and a computer-readable non-transitory storage medium that allow an easy acquisition of a wearable-item size more appropriate for a wearable-item wearer.

Means for Solving the Problems

A wearable-item size acquisition system of an aspect comprises: biological information acquisition means for acquiring subject biological information indicating biological information of an estimation subject; storage means for storing a plurality of pieces of biological information each associated with a wearable-item size indicating a size of a wearable item worn by the estimation subject; and wearable-item size estimation means for estimating the wearable-item size for the estimation subject based on the subject biological information acquired by the biological information acquisition means and on the plurality of pieces of biological information stored in the storage means.

This configuration allows the wearable-item size for the estimation subject to be estimated based on the subject biological information indicating biological information of the estimation subject, and therefore allows an easy acquisition of a wearable-item size more appropriate for a wearable-item wearer.

In the above-described wearable-item size acquisition system, the wearable-item size estimation means may estimate that the wearable-item size corresponding to one of the plurality of pieces of biological information stored in the storage means, the one being in the neighborhood of the subject biological information, is the wearable-item size for the estimation subject.

This configuration allows the wearable-item size for the estimation subject to be easily estimated from the subject biological information indicating biological information of the estimation subject.

The above-described wearable-item size acquisition system comprises appropriateness calculation means for calculating appropriateness of the wearable-item size estimated by the wearable-item size estimation means for the estimation subject.

This configuration allows determining whether the wearable item of the estimated wearable-item size fits the estimation subject or not.

In the above-described wearable-item size acquisition system, the appropriateness calculation means may calculate as the appropriateness a probability that the wearable-item size estimated by the wearable-item size estimation means is the wearable-item size for the estimation subject based on the plurality of pieces of biological information stored in the storage means.

This configuration allows an easy determination of whether the estimated wearable-item size is appropriate or not.

In the above-described wearable-item size acquisition system, the appropriateness calculation means may calculate the probability from a ratio or distribution of the wearable-item size associated with pieces of biological information that are among the plurality of pieces of biological information stored in the storage means and are included in a predetermined range defined with respect to the subject biological information.

This configuration allows an easy determination of whether the estimated wearable-item size is appropriate or not.

In the above-described wearable-item size acquisition system, the appropriateness calculation means may calculate as the appropriateness a correction index that is a difference between a representative value of the biological information for the wearable-item size estimated by the estimation means and the subject biological information or a difference between a representative value of measurements for the estimated wearable-item size and a measurement obtained from the subject biological information.

This configuration allows an easy determination of whether the estimated wearable-item size is appropriate or not.

In the above-described wearable-item size acquisition system, the appropriateness calculation means may calculate a probability that the wearable-item size estimated by the wearable-item size estimation means is the wearable-item size for the estimation subject based on the plurality of pieces of biological information stored in the storage means, and may calculate the representative value based on the biological information and the probability.

This configuration allows a more accurate determination of whether the estimated wearable-item size is appropriate or not, since the representative value is calculated by using the probability that the estimated wearable-item size is the wearable-item size for the estimation subject.

In the above-described wearable-item size acquisition system, the wearable-item size for the estimation subject estimated by the wearable-item size estimation means may be displayed on image display means.

This configuration allows the estimation subject to view the wearable-item size appropriate for the estimation subject.

The above-described wearable-item size acquisition system may comprise size-change time estimation means for estimating a time when the wearable-item size for the estimation subject changes, based on the subject biological information acquired before and the subject biological information acquired newly.

This configuration allows the estimation subject to recognize the estimation subject's own change in the body shape and an appropriate wearable-item size accompanying the change.

In the above-described wearable-item size acquisition system, the wearable item may be clothes of the estimation subject.

This configuration allows an easy acquisition of a clothing size more appropriate for the estimation subject.

In the above-described wearable-item size acquisition system, the storage means may store a plurality of pieces of biological information each associated with a wearable-item size as a database, which may be updated by addition of a new piece of biological information associated with the wearable-item size.

This configuration allows the database to be updated sequentially, improving the accuracy of estimating the wearable-item size for the estimation subject.

In the above-described wearable-item size acquisition system, the subject biological information may be biological information measured by a body composition analyzer that measures body composition based on bioimpedance of the estimation subject, and the biological information may be at least one of fat percentage, fat mass, fat-free mass, muscle mass, visceral fat mass, visceral fat level, visceral fat area, subcutaneous fat mass, basal metabolic expenditure, bone mass, body water percentage, BMI, intracellular fluid volume, and extracellular fluid volume.

This configuration allows the wearable-item size for the estimation subject to be estimated from the biological information calculated from the bioimpedance.

A wearable-item size acquisition program of an aspect causes a computer to function as wearable-item size estimation means for, based on a plurality of pieces of biological information each associated with a wearable-item size indicating a size of a wearable item worn by an estimation subject and on biological information of the estimation subject acquired by biological information acquisition means, estimating the wearable-item size for the estimation subject.

This configuration allows an easy acquisition of a wearable-item size more appropriate for a wearable-item wearer.

A wearable-item selection assistance method of an aspect has: a first step of, based on a plurality of pieces of biological information each associated with a wearable-item size indicating a size of a wearable item worn by a customer and on biological information of the customer acquired by biological information acquisition means, estimating the wearable-item size for the customer; a second step of displaying the wearable-item size estimated in the first step on an information-processing device of a store; and a third step of a store clerk viewing the wearable-item size displayed on the information-processing device and assisting the customer to select the wearable item.

This configuration allows a clerk of a store that provides customers with wearable items to recognize a customer who requires assistance in selecting a wearable item, therefore allowing an efficient operation.

Advantage of the Invention

This disclosure allows an easy acquisition of a wearable-item size more appropriate for a wearable-item wearer.

MODES OF EMBODYING THE INVENTION

Embodiments will now be described with reference to the drawings. The embodiments described below are merely illustrative of ways to implement the disclosure, and do not limit the disclosure to the specific configurations described below. When the disclosure is to be implemented, any specific configuration may be appropriately adopted according to the embodiment.

First Embodiment

Figure 1:
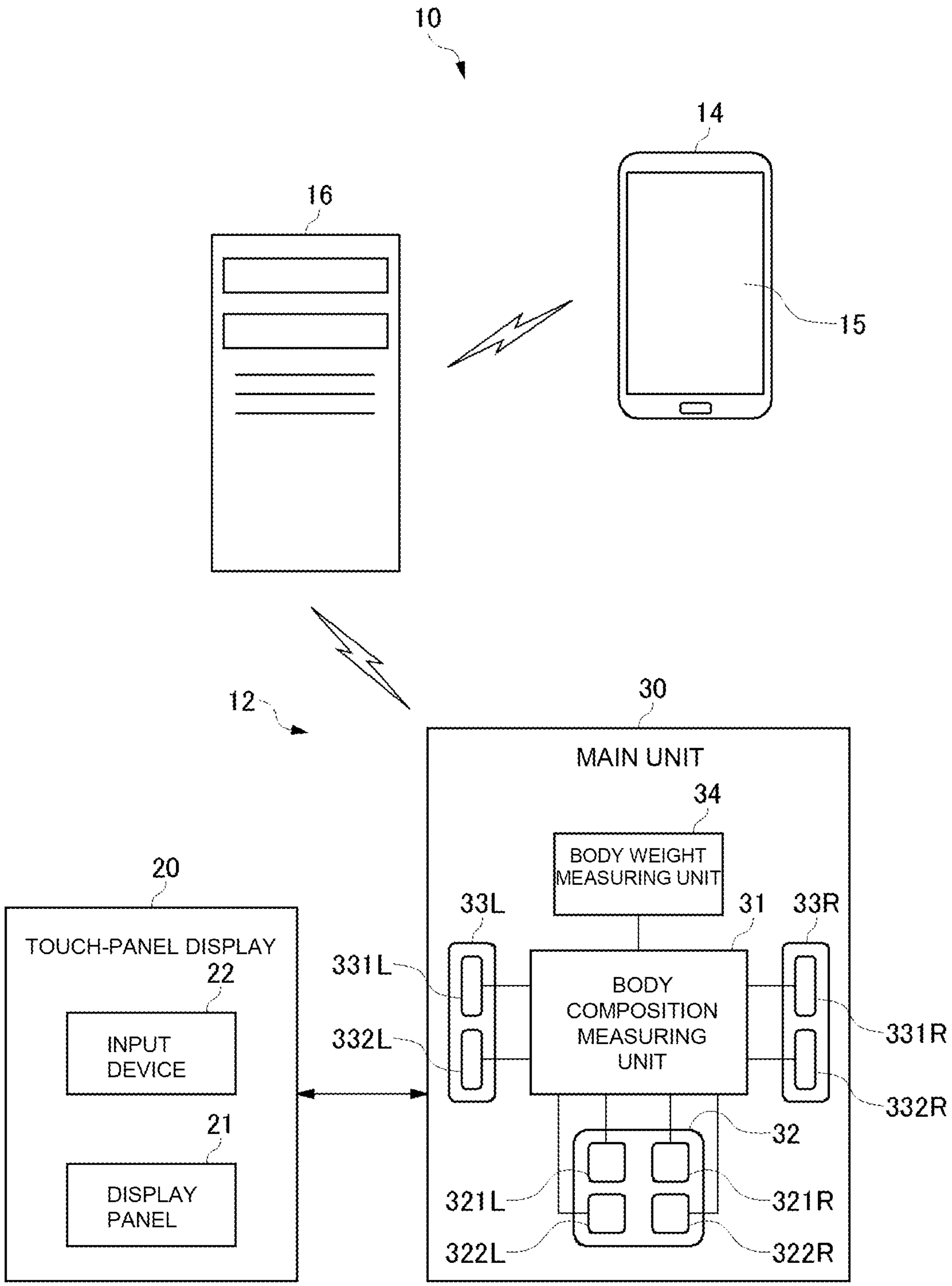
FIG. 1 shows a wearable-item size acquisition system of a first embodiment.

In this embodiment, a wearable item is defined, for example, as clothes, and a wearable-item size acquisition system is used in a store that sells clothes. Examples of clothes include a shirt, a jacket, trousers, a skirt, a coat, and underwear, but are not limited particularly as long as they are worn on the upper, lower, or whole body. FIG. 1 shows the wearable-item size acquisition system of the embodiment. The wearable-item size acquisition system 10 of the embodiment comprises a measuring device 12, a store terminal 14 that is an information-processing device, and a server 16.

The measuring device 12 is a body composition analyzer that measures body composition based on the bioimpedance of a person to be measured. The measuring device 12 of the embodiment is installed in each store that sells clothes, is used by a purchaser of clothes (hereinafter referred to as a "customer"), and measures the body composition of the customer. That is to say, a person to be measured of the embodiment is a customer, and is an estimation subject whose estimation clothing size described later is estimated.

The measuring device 12 of the embodiment comprises a touch-panel display 20 and a main unit 30. The touch-panel display 20 is mounted on the top end of a column extending upward from the main unit 30. The main unit 30 is also provided with a platform 32 on which a person to be measured steps, a right handgrip 33R, and a left handgrip 33L. A person to be measured stands barefoot on the platform 32, holds the right handgrip 33R with the right hand, and holds the left handgrip 33L with the left hand, thereby measuring the body composition. The measuring device 12 will be described in detail below.

The touch-panel display 20 comprises a display panel 21 such as an LCD panel, and an input device 22, such as a touch sensor, integrated with the display panel 21 to receive a touch input. An input device, such as a button or a switch, independent of the display panel 21 may be used as the input device 22. A measurement result obtained by the measuring device 12 and a result of estimation of a clothing size described in detail later (hereinafter referred to as a "clothing size estimation result") are displayed on the display panel 21.

The main unit 30 comprises a body composition measuring unit 31 and a body weight measuring unit 34 along with the platform 32, right handgrip 33R, and left handgrip 33L described above. The platform 32 comprises a right-foot energizing electrode 321R, a right-foot measuring electrode 322R, a left-foot energizing electrode 321L, and a left-foot measuring electrode 322L. The right handgrip 33R comprises a right-hand energizing electrode 331R and a right-hand measuring electrode 332R, and the left handgrip 33L comprises a left-hand energizing electrode 331L and a left-hand measuring electrode 332L.

The body weight measuring unit 34 comprises a load cell for measuring body weight. The load cell comprises a flexure element made of a metallic member that becomes deformed according to a load, and a strain gauge affixed to the flexure element. When a user steps on the platform 32, the user load causes the flexure element of the load cell to bend and the strain gauge expands and contracts. The resistance value (the output value) of the strain gauge changes according to the expansion and contraction. The body composition measuring unit 31 calculates body weight from a difference between the output value of the load cell under no load (zero point) and the output value under load. The same configuration as that of a common weight scale may be used as the configuration for the body weight measurement using the load cell.

Age, gender, and body height are inputted to the body composition measuring unit 31 as biological information of a person to be measured. These pieces of biological information are inputted via the touch-panel display 20 to the body composition measuring unit 31. Biological information acquired by means comprised in another device may be inputted to the body composition measuring unit 31. An example of the other device is a device that analyzes or performs some operation on an image of a person to be measured taken by a camera and estimates the body height, age, gender, or the like of the person to be measured, and a result of this estimation may be inputted to the body composition measuring unit 31 as biological information. Another piece of biological information of a person to be measured may be inputted to the body composition measuring unit 31 as well as body height, age, and gender.

The body composition measuring unit 31 has a current supply function to carry a small current of a predetermined frequency from each energizing electrode to a predetermined part of the body of a person to be measured, a potential difference measurement function to measure a difference in potential that occurs in a current path, and a bioimpedance calculation function to calculate the bioimpedance of the whole body and each body part of a user based on each value of those current and potential difference.

The measurement by the body composition measuring unit 31 of the bioimpedance of the whole body and each body part of a person to be measured is performed, for example, as follows:

(1) When the bioimpedance of the whole body is measured, a current is supplied by using the left-hand energizing electrode 331L and the left-foot energizing electrode 321L, and the difference in potential between the left-hand measuring electrode 332L being in contact with the left hand and the left-foot measuring electrode 322L being in contact with the left foot is measured in a current path where the current flows from the left hand through the left arm, the chest, the abdomen, and the left leg to the left foot.

(2) When the bioimpedance of the right leg is measured, a current is supplied by using the right-hand energizing electrode 331R and the right-foot energizing electrode 321R, and the difference in potential between the left-foot measuring electrode 322L being in contact with the left foot and the right-foot measuring electrode 322R being in contact with the right foot is measured in a current path where the current flows from the right hand through the right arm, the chest, the abdomen, and the right leg to the right foot.

(3) When the bioimpedance of the left leg is measured, a current is supplied by using the left-hand energizing electrode 331L and the left-foot energizing electrode 321L, and the difference in potential between the left-foot measuring electrode 322L being in contact with the left foot and the right-foot measuring electrode 322R being in contact with the right foot is measured in a current path where the current flows from the left hand through the left arm, the chest, the abdomen, and the left leg to the left foot.

(4) When the bioimpedance of the right arm is measured, a current is supplied by using the right-hand energizing electrode 331R and the right-foot energizing electrode 321R, and the difference in potential between the left-hand measuring electrode 332L being in contact with the left hand and the right-hand measuring electrode 332R being in contact with the right hand is measured in a current path where the current flows from the right hand through the right arm, the chest, the abdomen, and the right leg to the right foot.

(5) When the bioimpedance of the left arm is measured, a current is supplied by using the left-hand energizing electrode 331L and the left-foot energizing electrode 321L, and the difference in potential between the left-hand measuring electrode 332L being in contact with the left hand and the right-hand measuring electrode 332R being in contact with the right hand is measured in a current path where the current flows from the left hand through the left arm, the chest, the abdomen, and the left leg to the left foot.

The body composition measuring unit 31 calculates body composition measurement values for the whole body and each body part by applying inputted biological information of a person to be measured, body weight measured by the body weight measuring unit 34, and each calculated bioimpedance to a predetermined regression equation to perform an operation. The body composition measuring unit 31 calculates fat percentage, fat mass, fat-free mass, muscle mass, visceral fat mass, visceral fat level, visceral fat area, subcutaneous fat mass, basal metabolic expenditure, bone mass, body water percentage, BMI, intracellular fluid volume, and extracellular fluid volume as body composition measurement values. The same configuration as that of a common body composition analyzer can also be used as the configuration for the calculation of body composition measurement values. In the following description, biological information of a person to be measured inputted to the body composition measuring unit 31 and body composition measurement values calculated by the body composition measuring unit 31 are collectively referred to as subject biological information or body composition data.

While a person to be measured is preferably barefoot as described above when the measurement is performed by the measuring device 12, the person does not always have to step barefoot on the main unit 30 since the measuring device 12 of the embodiment is used by a customer of a store, and the measurement may be performed by the person stepping on the main unit 30 with, for example, socks or shoes on. In such a case, the biological information of the person to be measured is acquired without performing the measurement of bioimpedance using the energizing and measuring electrodes for the right and left legs. As just described, the measuring device 12 does not always have to measure bioimpedance using all the energizing and measuring electrodes for the right and left hands and legs, and may measure bioimpedance using energizing and measuring electrodes for at least two of the right and left hands and legs.

The measuring device 12 has a function to communicate with the server 16 or other information-processing devices, and it sends a measurement result obtained by the measuring device 12 itself to the server 16 and receives a clothing size estimation result from the server 16.

The configuration of the store terminal 14 and server 16 will be described next.

The store terminal 14 is an information-processing device comprising a touch-panel display 15, a computer capable of executing an application program, an internal storage such as a flash memory, various types of connectors, and the like. The store terminal 14 also comprises a wireless communication device for connecting to the Internet and a short-range communication device for connecting to another nearby device, and it receives a clothing size estimation result from the server 16 and displays the result on the touch-panel display 15. The store terminal 14 is held by a store clerk and is, for example, a portable information-processing device such as a smartphone and a tablet terminal, but it is not limited to those and may be another information-processing device such as a desktop or laptop personal computer.

The server 16 is an information-processing device comprising a computer such as a CPU (Central Processing Unit) capable of executing a program, a storage device such as an HDD (Hard Disk Drive), a communication device for connecting to the Internet or an intranet, various types of connectors, and the like. The server 16 of the embodiment is configured to be able to send and receive data to and from the measuring device 12 and the store terminal 14, and it estimates a clothing size or the like for a customer based on subject biological information received from the measuring device 12 and sends the clothing size estimation result to the measuring device 12 and the store terminal 14. The server 16 may be installed in each store or in each predetermined area including a plurality of stores.

Figure 2:
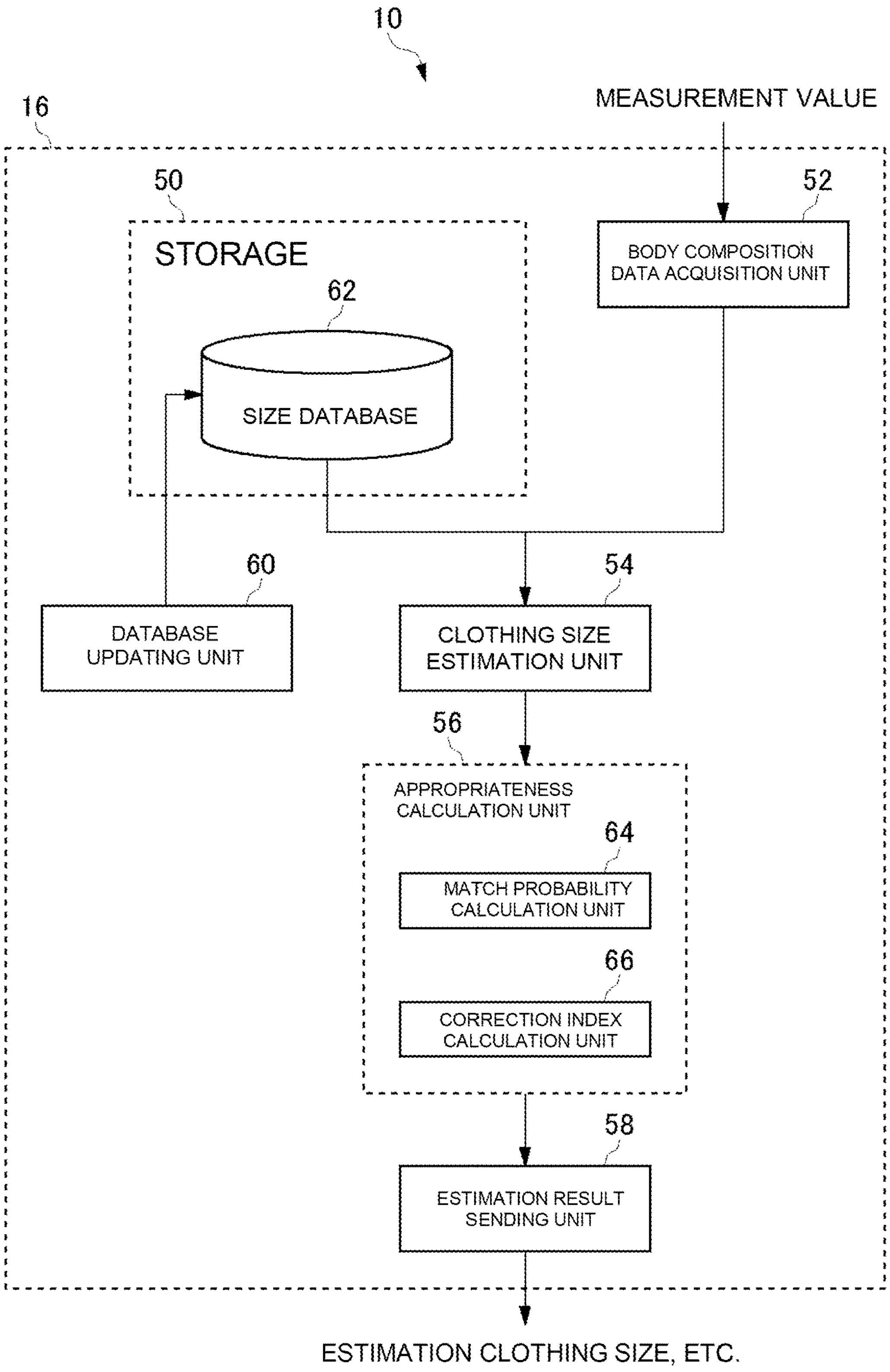
FIG. 2 is a function block diagram of the wearable-item size acquisition system of the first embodiment.

FIG. 2 is a function block diagram of the wearable-item size acquisition system 10 of the embodiment. The wearable-item size acquisition system 10 comprises a storage 50, a body composition data acquisition unit 52, a clothing size estimation unit 54, an appropriateness calculation unit 56, an estimation result sending unit 58, and a database updating unit 60. In the embodiment, each function shown in FIG. 2 is implemented by, for example, a computer comprised in the server 16 executing a clothing size estimation program stored in the storage 50. Each unit of the wearable-item size acquisition system 10 shown in FIG. 2 may be implemented by a separate piece of hardware such as an ASIC (Application Specific Integrated Circuit). In the following description, a person to be measured by the measuring device 12 is referred to as an estimation subject. The clothing size estimation program may be provided to the server 16 by the server 16 downloading it from a communications network, or via a non-transitory storage medium.

The storage 50 stores a plurality of pieces of biological information (body composition data) each associated with a clothing size (size data) indicating the size of clothes worn by an estimation subject. Specifically, the storage 50 stores as a size database 62 a plurality of pieces of body composition data each associated with a piece of size data.

The following notations (1) to (3) express the size database 62, where DB denotes the database, BC denotes body composition data, and CS denotes size data. n is an integer, and body composition data and size data whose values of n are the same correspond to each other. As seen above, the size database 62 is a set that has n combinations of body composition data and size data.

Mathematical Expression 1:

$$DB = [[BC], [CS], \dots ] \tag{1}$$

$$BC = [BC_1, BC_2, \dots , BC_n] \tag{2}$$

$$CS = [CS_1, CS_2, \dots , CS_n] \tag{3}$$

Figure 3:
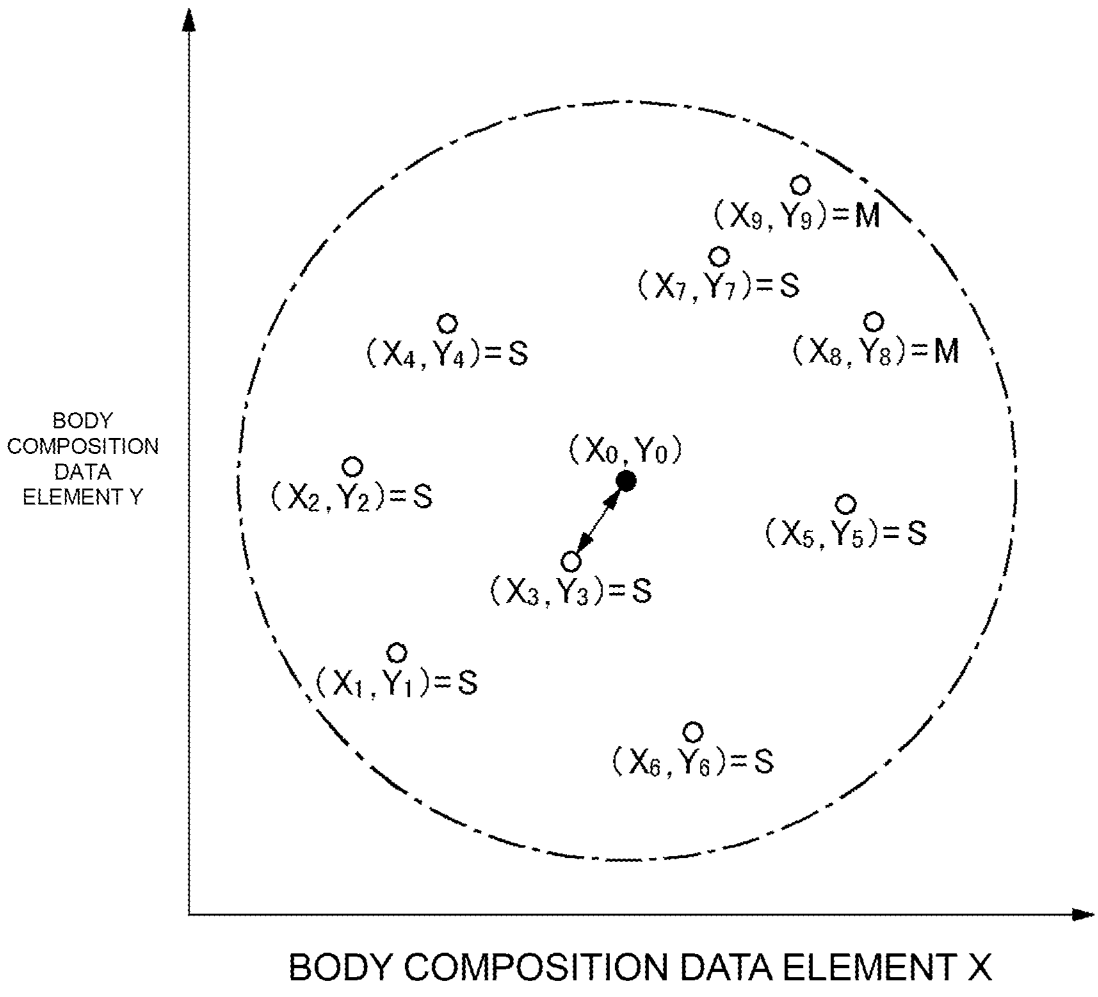
FIG. 3 is a schematic diagram of a clothing size database of the first embodiment.

FIG. 3 schematically shows the size database 62. Each piece of body composition data in the size database 62 in FIG. 3 is associated with, for example, a clothing size. Each piece of body composition data in the size database 62 is, for example, a combination of two kinds of body composition data elements X and Y, and the value of each body composition data is expressed as ($X_n$, $Y_n$) in FIG. 3. Note that ($X_o$, $Y_o$) shown with a black dot in FIG. 3 is a piece of subject biological information acquired by the measuring device 12 and is not contained in the size database 62.

The body composition data elements X and Y are, for example, any two of fat percentage, fat mass, fat-free mass, muscle mass, visceral fat mass, visceral fat level, visceral fat area, subcutaneous fat mass, basal metabolic expenditure, bone mass, body water percentage, BMI, intracellular fluid volume, and extracellular fluid volume. The size database 62 may be provided, for example, for each of the body weight and height of an estimation subject. Each piece of body composition data is not limited to the combination of two kinds of body composition data elements X and Y, and may be one kind of body composition data element X or a combination of three or more kinds of body composition data elements X, Y, Z, . . . as long as each piece of body composition data is associated with a clothing size. Each body composition data element may be another type of value as long as it can be inputted to the measuring device 12 by an estimation subject or it can be calculated from a bio-impedance measured by the measuring device 12.

Clothing size in the embodiment is, for example, a size represented by S (Small), M (Medium), L (Large), and the like, but it is not limited to this and may be another representation or may be a numerical value, numerical range, or ratio, such as abdominal girth and chest measurement, used for estimating a clothing size. Clothing size may be, for example, of a size type that changes according to the body shape of a wearer, such as Y, A, and AB, or of a clothes type such as straight, slim, and boot-cut.

The body composition data acquisition unit 52 acquires, via a communications line, subject biological information indicating body composition data of an estimation subject acquired by the measuring device 12.

The clothing size estimation unit 54 estimates a clothing size for an estimation subject based on subject biological information acquired by the body composition data acquisition unit 52 and on the plurality of pieces of body composition data stored in the storage 50. Specifically, the clothing size estimation unit 54 estimates that a piece of size data corresponding to a piece of body composition data which has the strongest relation with body composition data of an estimation subject in a multidimensional space defined by axes of body composition data is the clothing size for the estimation subject.

For example, the clothing size estimation unit 54 of the embodiment estimates that a clothing size corresponding to one of the plurality of pieces of body composition data ($X_n$, $Y_n$) stored in the storage 50, the one being in the neighborhood of the piece of subject biological information ($X_o$, $Y_o$), is the clothing size for the estimation subject. This allows the clothing size for the estimation subject to be easily estimated from the subject biological information indicating body composition data of the estimation subject.

The piece of body composition data ($X_n$, $Y_n$) being in the neighborhood of the piece of subject biological information ($X_o$, $Y_o$) is extracted from the plurality of pieces of body composition data ($X_n$, $Y_n$) by a predetermined arithmetic process as described below. An example of this arithmetic process extracts a piece of body composition data ($X_n$, $Y_n$) determined to be nearest the piece of subject biological information ($X_o$, $Y_o$). The arithmetic process, however, does not always have to extract a piece of body composition data ($X_n$, $Y_n$) determined to be nearest the piece of subject biological information ($X_o$, $Y_o$). For example, if a piece of body composition data ($X_n$, $Y_n$) associated with an inappropriate clothing size is nearest the piece of subject biological information ($X_o$, $Y_o$), another arithmetic process that does not extract the particular piece of body composition data ($X_n$, $Y_n$) may be performed.

Examples of the clothing size estimation method (arithmetic process) will be described below. Estimation methods (1) to (3) are illustrated in the embodiment, but the clothing size estimation method is not limited to them.

(1) Estimation Based on Euclidean Distance

In this estimation method (1), a piece of size data corresponding to a piece of body composition data whose Euclidean distance from a piece of subject biological information is the smallest is estimated to be a clothing size for the estimation subject. The following formula (4) is an example of a formula for calculating Euclidean distance.

Mathematical Expression 2:

$$D_i = \sum_j |v_{ij} - v_{oj}| \times w_j \tag{4}$$

where i is a data number in the size database, j is the number of a variable (axis) composing the multidimensional space coordinates, $D_i$ is a similarity between data i and measurement data, $v_{ij}$ is a vector of the j-th variable composing the i-th piece of body composition data, $v_{oj}$ is a vector of the j-th variable composing body composition data of an estimation subject (subject biological information), and $w_j$ is a weight assigned to the j-th variables, where wi=1 if no weight is assigned.

As for the example in FIG. 3, the clothing size is estimated to be “S” because the Euclidean distance of a piece of body composition data ($X_3$, $Y_3$) with respect to the piece of subject biological information ($X_o$, $Y_o$) is the smallest.

(2) Estimation from a Neighbor Data Group

In this estimation method (2), a piece of size data that is among and is the most frequent in a neighbor data group which is a set of pieces of body composition data determined to be neighbors of a piece of subject biological information (hereinafter also referred to as the “cluster”) is estimated to be a clothing size for the estimation subject. Let k be the number of pieces of data adopted as the neighbors, and the neighbor data group kDB is expressed by a notation (5) described below. The cluster may be defined to be, for example, pieces of body composition data that are within a predetermined Euclidean distance of the piece of subject biological information, though the method of defining the cluster is not particularly limited.

Mathematical Expression 3:

$$kDB = [D_1, D_2, \ldots , D_k] \tag{5}$$

In the estimation method (2), a piece of size data that is among and is the most frequent in pieces of size data included in the notation (5) is estimated to be a clothing size for the estimation subject. If k=1, a piece of size data $D_1$ that is nearest the piece of subject biological information ($X_o$, $Y_o$) is estimated to be a clothing size for the estimation subject.

Pieces of size data may be weighted according to their Euclidean distance from the piece of subject biological information as shown in the formula (6) below. $\mathrm{Count}_{modify\_x}$ is the value of $k_x$, which is the number of a clothing size x included in kDB, weighted by the Euclidean distance. A piece of size data whose $\mathrm{Count}_{modify\_x}$ is the greatest is estimated to be a clothing size for the estimation subject.

Mathematical Expression 4:

$$\mathrm{Count}_{modify\_x} = \frac{\exp\left(\frac{k_x}{k} \times (D_1 + D_2 + \ldots + D_x)\right)}{\sum_i \exp\left(\frac{k_i}{k} \times (D_1 + D_2 + \ldots + D_i)\right)} \tag{6}$$

(3) Estimation from a Density-Based Cluster

A maximal set of pieces of body composition data that are among pieces of body composition data contained in the size database 62 and satisfy conditions expressed by notations (7) to (9) below is defined as a cluster (density-based cluster).

Mathematical Expression 5:

$$N_\varepsilon(q):\{p \in n | DB(p, q) \leq \varepsilon\} \quad (7)$$

$$p \in N_\varepsilon(q) \quad (8)$$

$$N_\varepsilon(q) \geq MinPts \quad (9)$$

where

- p and q are arbitrary pieces of data in the size database,
- ε is the Euclidean distance between the pieces of data p and q, and
- $N_\varepsilon$ is a point set of pieces of data that are within the distance ε.

In the estimation method (3), a piece of size data that is among and is the most frequent in a density-based cluster including the piece of subject biological information is estimated to be a clothing size for the estimation subject.

A clothing size estimated by the clothing size estimation unit 54 (hereinafter referred to as an "estimation clothing size") is outputted to the appropriateness calculation unit 56.

The appropriateness calculation unit 56 calculates the appropriateness of an estimation clothing size for an estimation subject. Since an estimation clothing size is estimated from subject biological information which is body composition data of an estimation subject, the estimation result may sometimes be inappropriate. Therefore, the appropriateness calculation unit 56 calculating the appropriateness of an estimation clothing size and the estimation subject who is a customer or a store clerk checking the result allow determining whether a wearable item of the estimated wearable-item size fits the estimation subject or not. Accordingly, the estimation subject can select optimal clothes independently or with the assistance of the store clerk. The appropriateness calculation unit 56 of the embodiment comprises a match probability calculation unit 64 and a correction index calculation unit 66.

The match probability calculation unit 64 calculates as the appropriateness the probability that an estimation clothing size is a clothing size for an estimation subject (hereinafter referred to as "match probability") based on the plurality of pieces of body composition data stored in the storage 50. In other words, match probability is an index of whether an estimation clothing size is appropriate for the estimation subject or not. The more appropriate an estimation clothing size is for the estimation subject, the larger the value of match probability is.

The match probability calculation unit 64 of the embodiment calculates match probability, for example, from the ratio or distribution of a clothing size associated with pieces of body composition data that are among the plurality of pieces of body composition data stored in the storage 50 and are included in a predetermined range defined with respect to the subject biological information. This allows the appropriateness calculation unit 56 to easily determine whether an estimation clothing size is appropriate or not.

Examples of the method of calculating match probability will be described below. The following calculation methods (1) and (2) are illustrated in the embodiment, but the calculation method is not limited to them.

(1) Calculation from the Ratio of Pieces of Size Data Included in a Cluster

Let $N_t$ be the number of pieces of size data that are included in a cluster to which a piece of subject biological information belongs and are identical with an estimation clothing size, let $N_f$ be the number of pieces of size data that are included in the cluster and are different from the estimation clothing size, and then a match probability $P_t$ is calculated as the following formula (10).

Mathematical Expression 6:

$$P_t = \frac{N_t}{N_t + N_f} \quad (10)$$

In the example in FIG. 3, a cluster including the piece of subject biological information ($X_o$, $Y_o$) is indicated by an alternate long and short dash line. There are seven pieces of body composition data that are included in the cluster and are determined to be S-size and two pieces of body composition data that are determined to be M-size, and therefore the match probability of an estimation clothing size "S" is determined to be approximately 78%.

A plurality of kinds of clothing sizes that are different from an estimation clothing size may sometimes be included in a cluster. In such a case, the probability that a clothing size is included in the cluster is also calculated for each of the different kinds of clothing sizes. Specifically, when an estimation clothing size is "M," pieces of body composition data whose clothing size is "S" and pieces of body composition data whose clothing size is "L" may be included in the cluster. In such a case, the match probability calculation unit 64 also calculates the probability that the cluster includes the clothing size "S" and the probability that the cluster includes the clothing size "L." Consequently, whether the size for the body shape of the estimation subject is close-to-S M or close-to-L M can be determined from the probability of the clothing sizes that are different from the estimation clothing size.

For example, if a cluster comprising ten pieces of body composition data has seven pieces of body composition data whose clothing size is "M," one piece of body composition data whose clothing size is "S," and two pieces of body composition data whose clothing size is "L," then the estimation clothing size for the piece of subject biological information that belongs to this cluster is determined to be "M" and its match probability is determined to be 70%. The probability of the clothing size "S" is 10%, and the probability of the clothing size "L" is 20%. In this case, a clothing size for the estimation subject is estimated to be close-to-L M. The probability of each clothing size may be distinguished by, for example, adding the minus sign to the probability of the clothing size "S" and adding the plus sign to the probability of the clothing size "L."

(2) Calculation from the Difference in Distribution of Pieces of Body Composition Data for Each Size Included in a Cluster Let $p_t$ be the probability distribution of pieces of body composition data that are included in a cluster to which a piece of subject biological information belongs and are determined to be the same size data as an estimation clothing size, let p be the probability distribution of the pieces of body composition data of the cluster, and then the difference in distribution $KL(p_t \| p)$ is expressed by the formula (11) below. A match probability $P_t$ is then calculated by the formula (12) below using the difference $KL(p_t \| p)$.

Mathematical Expression 7:

$$KL(p_t\|p) = \int_{-\infty}^{\infty} p_t(BC_k)\ln\frac{p_t(BC_k)}{p(BC_k)}dBC_k \tag{11}$$

where $BC_k$ is a piece of body composition data for a variable (an axis) k in the multidimensional space comprising the pieces of body composition data.

Mathematical Expression 8:

$$P_t = \frac{1}{1 + e^{KL(p_t\|p)}} \tag{12}$$

On the other hand, the correction index calculation unit 66 calculates as the appropriateness a correction index that is a difference between a representative value of body composition data for an estimation clothing size and subject biological information or a difference between a representative value of measurements for an estimation clothing size (hereinafter referred to as "estimation measurements") and a measurement obtained from subject biological information (hereinafter referred to as a "subject-biological-information measurement"). In other words, a correction index is an index of how far the body shape of an estimation subject is from a representative body shape appropriate for an estimation clothing size. This allows the appropriateness calculation unit 56 to easily determine whether an estimation clothing size is appropriate or not.

Note that representative values of body composition data for an estimation clothing size and of estimation measurements are, for example, stored in advance in the size database 62. A subject-biological-information measurement is, for example, obtained by acquiring body shape data corresponding to the subject biological information from a database storing body composition data and reference body shape data associated with each other.

An example of a correction index is expressed as the following formula (13).

Mathematical Expression 9:

$$M_{m,t} = BC_{m,med} - BC_t \tag{13}$$

where $M_{m,t}$ is a correction index for a size m, $BC_{m,med}$ is a representative value of body composition data for the size m, and $BC_t$ is subject biological information.

The size m is an estimation clothing size, and is either one of "S," "M," or "L" in the embodiment. $BC_{m,med}$ may be a representative value of estimation measurements for the size m, and $BC_t$ may be a subject-biological-information measurement.

When $BC_{m,med}$ is a representative value of body composition data and $BC_t$ is subject biological information, the correction index $M_{m,t}$ is expressed, for example, in percentage (%), and the requirement for correction increases with an increase in this value. When $BC_{m,med}$ is a representative value of estimation measurements and $BC_t$ is a subject-biological-information measurement, the correction index $M_{m,t}$ is expressed, for example, in length (cm), and the requirement for correction increases with an increase in this value.

The correction index calculation unit 66 may give a label indicating "correction is required" to an estimation clothing size if a calculated correction index is greater than or equal to a predetermined threshold value, and may give a label indicating "no correction is required" if the correction index is smaller than the threshold value. In the case of "correction is required," a store clerk provides assistance for the selection of clothes as described later. In addition, the correction index may be displayed on the touch-panel display 20 of the measuring device 12 so that the estimation subject can view, and the estimation subject who viewed the correction index may independently choose if a correction is required or not via the touch-panel display 20.

While a representative value of estimation measurements is acquired from the size database 62 as described above, it may be acquired otherwise and may be calculated based on body composition data and above-described match probability. According to a conventional art, a representative value of estimation measurements could be calculated by assigning body composition data to a variable in a predetermined function. This function, however, was obtained by a statistical technique and could be based on statistics including odd data, and the calculation of a representative value using the function would decrease the accuracy of estimating the representative value.

The accuracy of estimating a representative value of estimation measurements can therefore be further improved by using match probability to assign weight to data of a statistically high and a statistically low appearance ratio to calculate a representative value of estimation measurements. In other words, the use of match probability in calculation of a representative value of estimation measurements means that the representative value is calculated with consideration for how different the body shape of an estimation subject is from a clothing size. More specifically, when an estimation clothing size is calculated to be "S," a lower match probability indicates that the body shape of the estimation subject is nearer the clothing size "M." Match probability is thus used to calculate a representative value of estimation measurements, and the representative value is therefore calculated as a more appropriate value for the estimation subject, that is, a value near the clothing size "M."

An example of a method of calculating a representative value of estimation measurements uses match probability as a threshold value and uses different calculation formulas depending on which side of the threshold value a calculated match probability is on, as shown in the mathematical expressions (14) and (15) below. The mathematical expressions (14) and (15) are an example of calculation formulas for a representative value of arm measurements of clothes, where Larm is longitudinal arm length, $FAT_{arm}$ is arm fat mass, and $WEIGHT_{arm}$ is arm weight, and these values are stored as average values in the size database 62 for each clothing size in advance. Specifically, a representative value of estimation measurements is calculated by the mathematical expression (14) if a match probability $P_t$ calculated by the match probability calculation unit 64 is greater than or equal to a predetermined match probability, and a representative value of estimation measurements is calculated by the mathematical expression (15) if the match probability $P_t$ is smaller than the predetermined match probability.

Mathematical Expression 10:

$$P_t \geqq X;\ f(L_{arm}, \mathrm{FAT}_{arm}, \mathrm{WEIGHT}_{arm}) \quad (14)$$

$$P_t < X;\ g(L_{arm}, \mathrm{FAT}_{arm}, \mathrm{WEIGHT}_{arm}) \quad (15)$$

There may be another example of a method of calculating a representative value of estimation measurements, in which the match probability $P_t$, for example, is added as a variable of the function as shown in the following mathematical expression (16).

Mathematical Expression 11:

$$f(L_{arm}, \mathrm{FAT}_{arm}, \mathrm{WEIGHT}_{arm}, P_t) \quad (16)$$

Appropriateness including match probability and a correction index thus calculated by the appropriateness calculation unit 56 is outputted with an estimation clothing size to the estimation result sending unit 58.

The estimation result sending unit 58 sends an estimation clothing size estimated by the clothing size estimation unit 54 and match probability and a correction index calculated by the appropriateness calculation unit 56 via a communications line to the measuring device 12 and the store terminal 14.

The database updating unit 60 updates the size database 62 by adding (registering) a new piece of body composition data associated with a piece of size data. An information-processing device that has access to the size database 62 is designated in advance, and a combination of a piece of body composition data and a piece of size data to be newly added to the database is inputted from the information-processing device to the database updating unit 60. This allows the size database 62 to be updated sequentially, improving the accuracy of estimating an estimation clothing size for an estimation subject. The size database 62 is updated, for example, by an operator (a provider) of the service of the wearable-item size acquisition system 10. A registered combination of a piece of body composition data and a piece of size data may be deleted from the size database 62.

Figure 4:
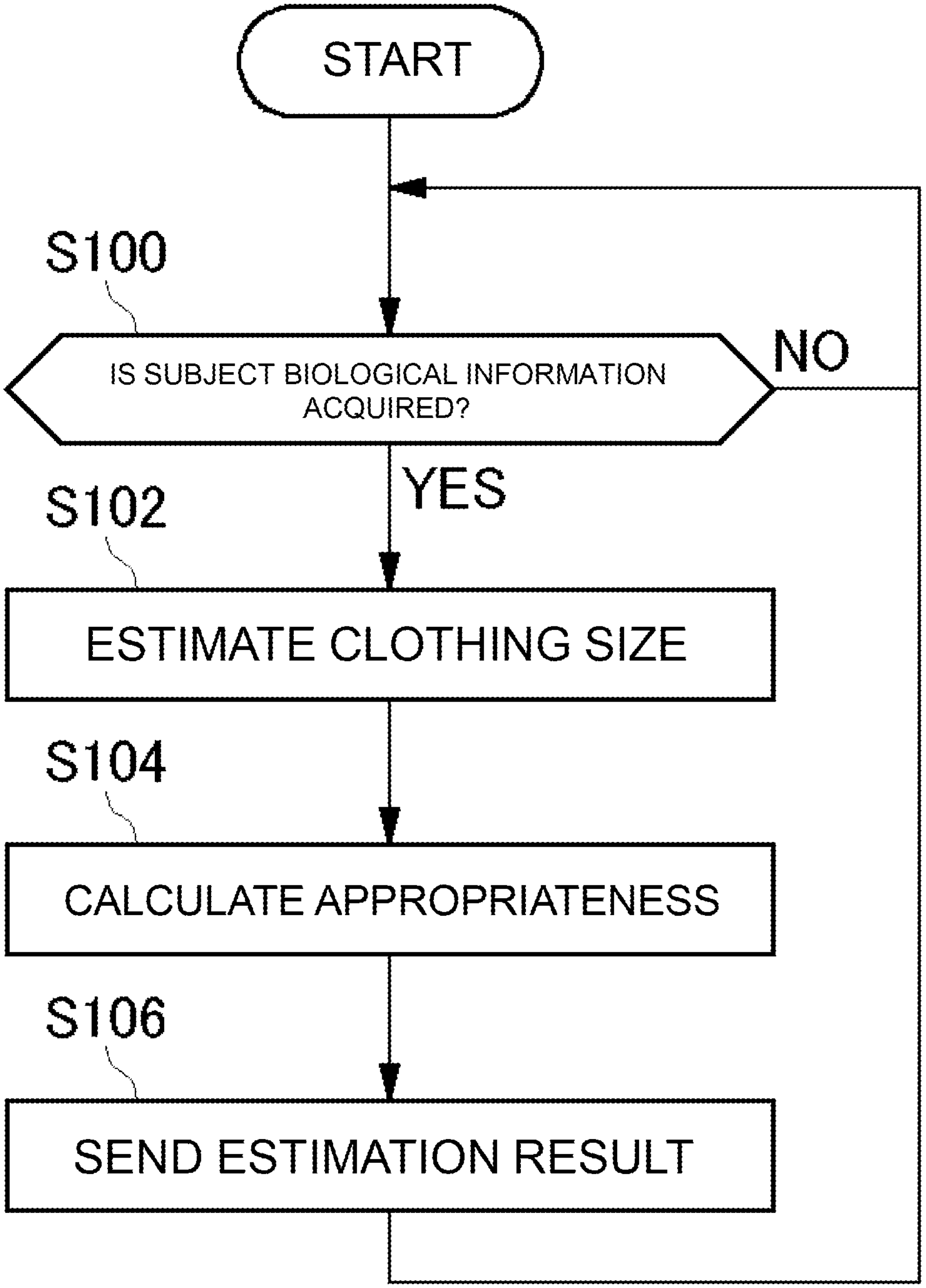
FIG. 4 is a flowchart of a wearable-item size acquisition method of the first embodiment.

FIG. 4 is a flowchart showing a flow of the clothing size estimation process (the clothing size estimation program) to be executed by the server 16.

In a step S100, the body composition data acquisition unit 52 first determines if subject biological information is inputted from the measuring device 12 or not, and if an affirmative determination is made, the flow proceeds to a step S102 as a result of acquiring subject biological information. If a negative determination is made, the body composition data acquisition unit 52 enters a wait state until subject biological information is inputted.

Note that the measuring device 12 sends subject biological information to the server 16 when an estimation subject chooses to execute the clothing size estimation process via the touch-panel display 20 of the measuring device 12. When executing the clothing size estimation process, the estimation subject who is a customer of the store inputs identification information for identifying the customer including, for example, a membership number for the store and the customer's name.

In the step S102, the clothing size estimation unit 54 estimates a clothing size for the estimation subject based on body composition data contained in the size database 62 and the acquired subject biological information.

In the next step S104, the appropriateness calculation unit 56 calculates match probability and a correction index as the appropriateness of the estimation clothing size for the estimation subject.

In the next step S106, the estimation result sending unit 58 sends the estimation clothing size, the match probability, and the correction index to the measuring device 12 and the store terminal 14. The estimation clothing size, the match probability, and the correction index are displayed on the touch-panel display 20 of the measuring device 12 and the touch-panel display 15 of the store terminal 14.

This allows the customer to check a clothing size appropriate for the customer without relying on a store clerk. Since a store clerk also views the customer's estimation clothing size, match probability, and correction index, the store clerk can provides the customer with assistance for the selection of clothes (hereinafter referred to as "clothing selection assistance") as required. Time at which the customer did the measurement using the measuring device 12, the identification information inputted by the customer, and the like are also displayed on the store terminal 14 along with the estimation clothing size and the like. This allows the store clerk to identify the customer who did the estimation of the estimation clothing size.

The sending of an estimation clothing size and the like to the store terminal 14 may be done, for example, when any of the conditions below is satisfied, instead of every time. This allows a store clerk to speak to a customer and do clothing selection assistance only when the customer is considered to require it. Even a customer who does not want a store clerk or the store to know the customer's body composition data, estimation clothing size, or the like can also use the system.

(1) A predetermined time T1 has passed since a customer finished measurement by the measuring device 12.

(2) The match probability is smaller than a predetermined value P.

(3) The correction index is greater than or equal to a predetermined value M.

(4) A customer chose "Require correction," or "Require selection assistance" for a store clerk.

(5) A customer has stayed in the store over a predetermined time T2.

(6) A customer chose "Send the estimation clothing size."

The conditions (1) and (5) correspond to when the customer may be wondering whether to buy clothes. Determination about the predetermined times T1 and T2 is made by, for example, recognizing the face of a customer using a camera installed in the store and measuring time that has elapsed since the customer finished the measurement or time that has elapsed since the customer entered the store. The conditions (2) and (3) correspond to when an estimation clothing size may be inappropriate for a customer, and then a store clerk's selection assistance is required. The condition (4) corresponds to when a customer feels that an estimation clothing size may be inappropriate. The condition (6) corresponds to when a customer themself wants to consult a store clerk and buy clothes regardless of whether an estimation clothing size is or is not appropriate. The sending of an estimation clothing size and the like to the store terminal 14 may be done when a customer chose "Send the estimation clothing size" and the conditions (1) to (5) are satisfied.

An estimation clothing size estimated by the clothing size estimation unit 54, and match probability and a correction index calculated by the appropriateness calculation unit 56 may be outputted by an information-processing device and, for example, may be printed on a recording medium by a printer connected with the measuring device 12 or the store terminal 14. Only an estimation clothing size may be sent to the measuring device 12, and the estimation clothing size, match probability, and a correction index may be sent to the store terminal 14.

As described above, the wearable-item size acquisition system 10 of the embodiment estimates a clothing size for an estimation subject based on subject biological information indicating body composition data of the estimation subject, and determines if the estimated clothing size is appropriate for the estimation subject. The wearable-item size acquisition system 10 of the embodiment therefore allows a customer who buys clothes to easily acquire a clothing size appropriate for themself.

In the embodiment, a plurality of size databases 62 may be provided instead of the one size database 62. This is because different makers, brands, or the like may have different clothing size designations, or because actual measurements of clothes may be slightly different even if the designation is the same as other makers or the like. In view of the above, the size database 62 may be provided for each clothing maker, brand, or fashion category. In this mode, the names of makers or brands of clothes available in the store are displayed on the touch-panel display 20 when an estimation subject who is a customer does measurement using the measuring device 12. The estimation subject then chooses a maker or brand of clothes the estimation subject wants to buy, and causes the wearable-item size acquisition system 10 to execute the clothing size estimation process. Accordingly, the wearable-item size acquisition system 10 uses the size database 62 corresponding to the chosen maker or brand to execute the clothing size estimation process.

The size database 62 may be provided for each store. In this mode, a store clerk may perform generation, update, or the like of the size database 62 via the store terminal 14. Specifically, only clothes of a maker, brand, or the like available in the store are registered in the size database 62, and clothes of a maker or brand no longer available or out of stock are removed from the size database 62.

The wearable-item size acquisition system 10 provided with the size database 62 for each maker or brand may show clothes of a maker, brand, or the like recommended for purchase along with an estimation clothing size to an estimation subject in accordance with the estimation subject's subject biological information or history of past purchases.

While a description has been made for the embodiment on a mode in which the server 16 executes the clothing size estimation process, the embodiment is not limited to this, and the measuring device 12 may have the functions shown in FIG. 2 and may execute the clothing size estimation process. In this mode, for example, the measuring device 12 and the store terminal 14 are made to be able to send and receive data between each other via Bluetooth (registered trademark) or other short-range communications, and an estimation clothing size and appropriateness calculated by the measuring device 12 are sent from the measuring device 12 to the store terminal 14. On the other hand, the server 16 stores the size database 62 and also comprises the database updating unit 60 to sequentially update the size database 62. The measuring device 12 acquires the new size database 62 from the server 16 via the store terminal 14, and stores it.

Second Embodiment

A second embodiment will be described. While a description has been made for the first embodiment on a mode in which the measuring device 12 is installed in a store, a description will be made for this embodiment on a mode in which the measuring device 12 is installed in an estimation subject's home.

Figure 5:
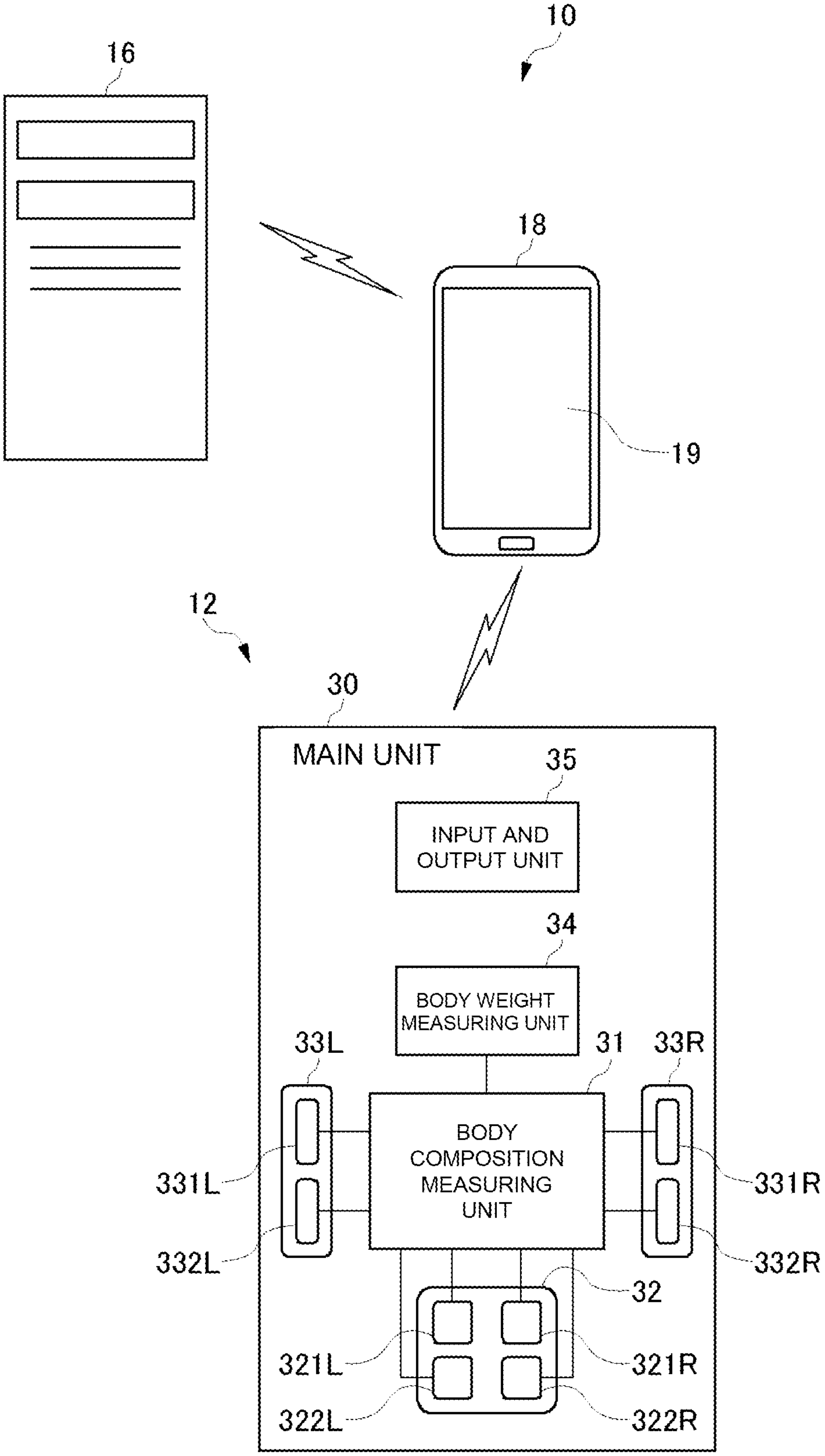
FIG. 5 shows a wearable-item size acquisition system of a second embodiment.

FIG. 5 is a schematic configuration view of the wearable-item size acquisition system 10 of the embodiment. The same components in FIG. 5 as in FIG. 1 are designated by the same symbols, and their descriptions are omitted. In the embodiment, the main unit 30 is provided with a simple input and output unit 35 that indicates, for example, on/off of power, switching between functions, and a measurement result. An information-processing device such as a smartphone held by an estimation subject (hereinafter referred to as the "user terminal") 18 and the measuring device 12 are made to be able to send and receive data between each other via short-range communications, and subject biological information measured by the measuring device 12 is sent to the user terminal 18. After the estimation subject enters an instruction to execute the clothing size estimation process via the user terminal 18, the measured subject biological information of the estimation subject is sent to the server 16, which executes the clothing size estimation process. An estimation clothing size calculated by the server 16 is sent to the user terminal 18 and is displayed on a touch-panel display 19 of the user terminal 18.

Figure 6:
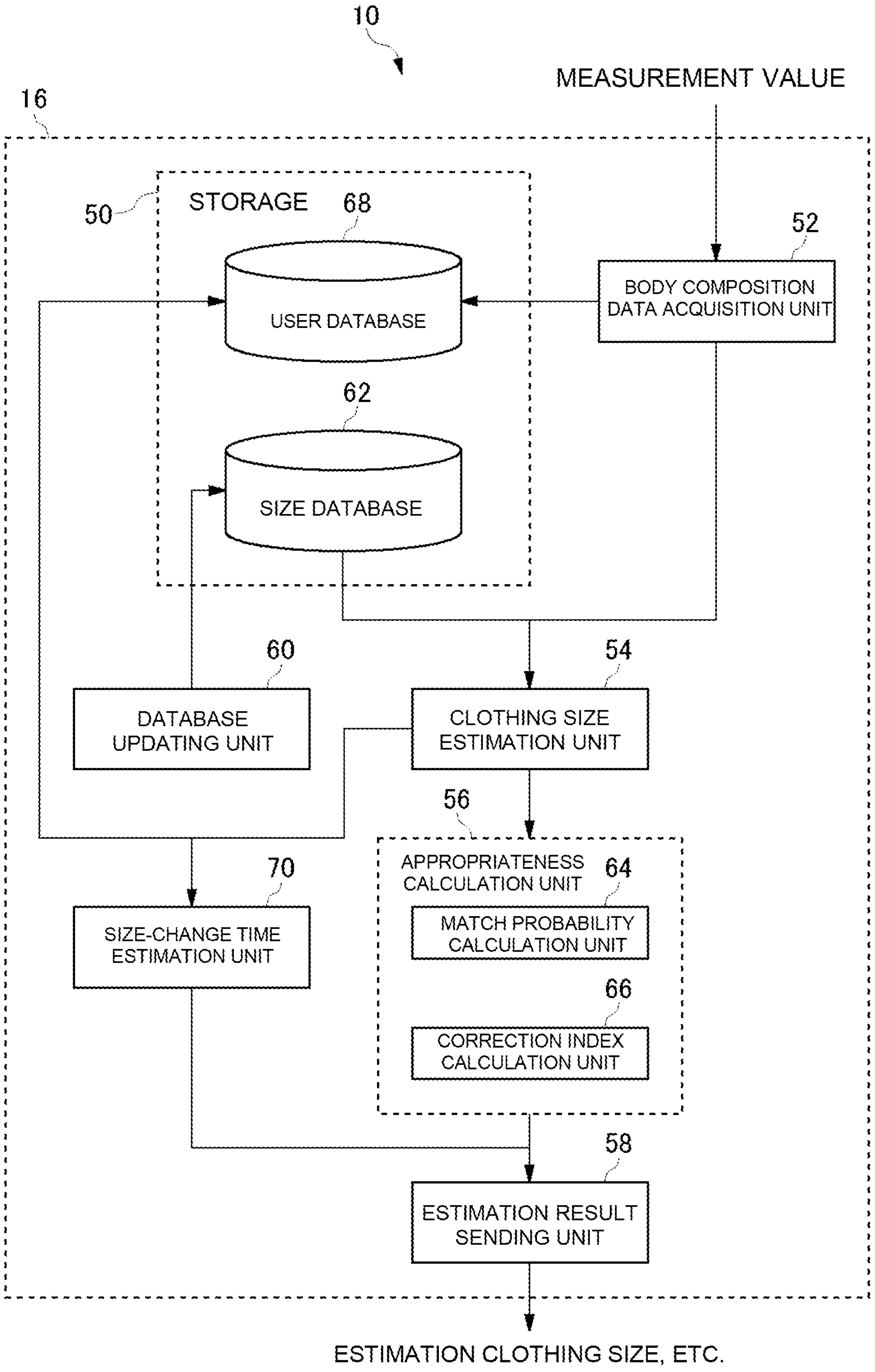
FIG. 6 is a function block diagram of the wearable-item size acquisition system of the second embodiment.

FIG. 6 is a function block diagram showing the electrical configuration of the wearable-item size acquisition system 10 of the embodiment. The same function blocks in FIG. 6 as in FIG. 2 are designated by the same symbols, and their descriptions are omitted.

The wearable-item size acquisition system 10 of the embodiment comprises a user database 68 in the storage 50. The user database 68 is provided for each estimation subject, and each user database 68 stores estimation results of the clothing size estimation process previously done by an estimation subject and pieces of subject biological information along with the dates. For this purpose, each time the body composition data acquisition unit 52 acquires subject biological information, it makes the relevant user database 68 store the subject biological information. The clothing size estimation unit 54, each time it estimates an estimation clothing size, also makes the relevant user database 68 store the estimation clothing size in association with subject biological information used for the estimation.

The wearable-item size acquisition system 10 of the embodiment further comprises a size-change time estimation unit 70. The size-change time estimation unit 70 estimates a time when a clothing size for an estimation subject changes (hereinafter referred to as a "size-change time"), based on subject biological information acquired before and subject biological information acquired newly. In other words, the size-change time estimation unit 70 estimates a time when the clothing size is considered to change based on the tendency of change in body composition data of the estimation subject. That is to say, a size-change time is an index indicating a change in the body shape of an estimation subject, and the estimation subject can recognize the estimation subject's own change in the body shape by checking the size-change time.

The size-change time estimation unit 70 estimates a time when a clothing size for an estimation subject changes in the future by, for example, extrapolation based on an approximate line between subject biological information acquired before and subject biological information acquired newly. The estimated size-change time is outputted to the estimation result sending unit 58.

The estimation result sending unit 58 sends a size-change time along with an estimation clothing size and the like to the user terminal 18.

Figure 7:
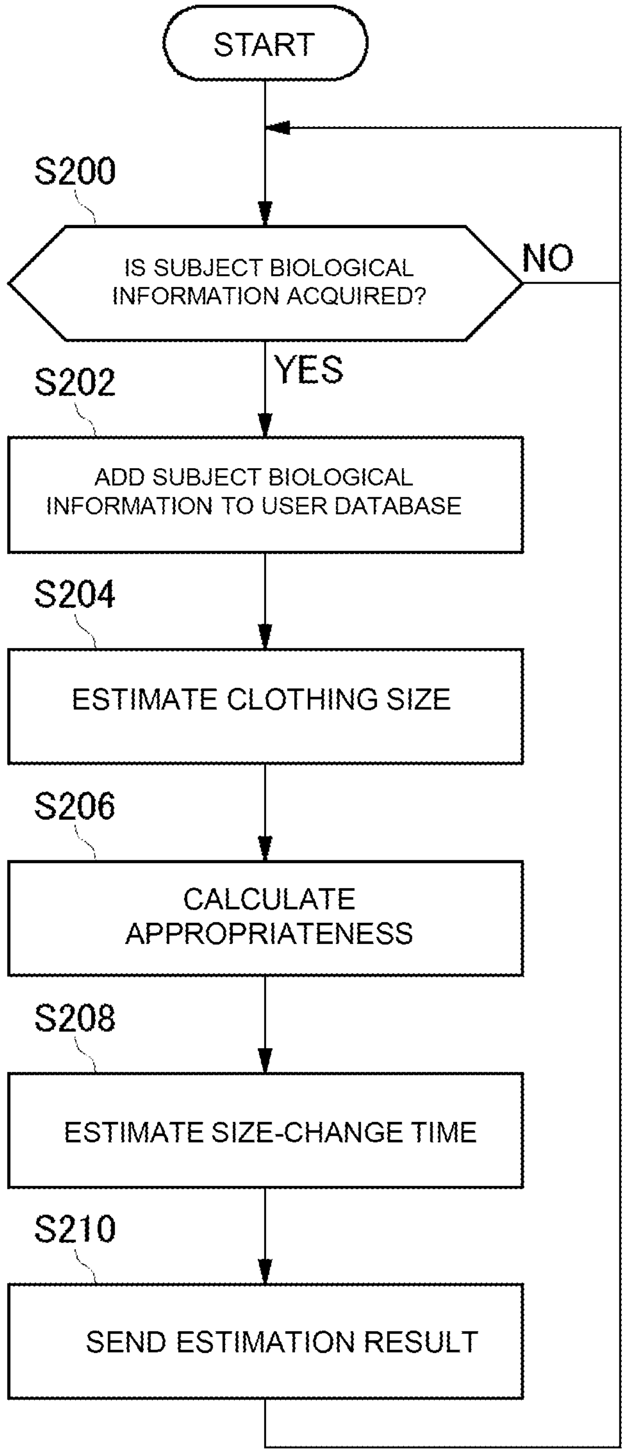
FIG. 7 is a flowchart of a wearable-item size acquisition method of the second embodiment.

FIG. 7 is a flowchart showing a flow of the clothing size estimation process (the clothing size estimation program) to be executed by the server 16 of the embodiment.

In a step S200, the body composition data acquisition unit 52 first determines if subject biological information measured by the measuring device 12 is inputted from the user terminal 18 or not, and if an affirmative determination is made, the flow proceeds to a step S202 as a result of acquiring subject biological information. If a negative determination is made, the body composition data acquisition unit 52 enters a wait state until subject biological information is inputted.

In the step S202, the body composition data acquisition unit 52 makes the relevant user database 68 store the acquired subject biological information.

In a step S204, the clothing size estimation unit 54 estimates a clothing size for the estimation subject based on body composition data contained in the size database 62 and the acquired subject biological information.

In the next step S206, the appropriateness calculation unit 56 calculates match probability and a correction index as the appropriateness of the estimation clothing size for the estimation subject.

In the next step S208, the size-change time estimation unit 70 estimates a size-change time.

In the next step S210, the estimation result sending unit 58 sends the estimation clothing size, the match probability, the correction index, and the size-change time to the user terminal 18 of the estimation subject. Accordingly, the estimation clothing size, the match probability, the correction index, and the size-change time are displayed on the touch-panel display 19 of the user terminal 18. The estimation subject can therefore recognize a clothing size appropriate for themself and, if a change in clothing size due to a change in body shape is estimated to occur, can also recognize the change time.

There may be a case in which, for example, a size-change time is displayed as "no change in clothing size" if a clothing size for an estimation subject is not estimated to change in a predetermined time period (e.g. in six months). In other words, a time for the clothing size to change is displayed when the clothing size is going to change in the above-mentioned predetermined time period.

The wearable-item size acquisition system 10 of the embodiment may send (give notice of) an estimation subject's estimation clothing size and size-change time to an information-processing device of a store registered in advance by the estimation subject. This allows a clerk of the store to assist in selecting clothes more appropriately without measuring the body shape of the estimation subject on the estimation subject's visit.

The sending of an estimation clothing size, a size-change time, and the like to an information-processing device of a store may be done, for example, when any of the conditions below is satisfied.

(1) An estimation subject's estimation clothing size or actually purchased clothing size at the time of previous purchase is different from a new estimation clothing size, and the match probability of the new estimation clothing size is greater than or equal to a predetermined value P.

(2) A value required to determine a clothing size such as an estimation subject's body height, abdominal girth, or other input values or subject biological information at the time of the previous measurement has changed so much that the clothing size requires change.

While the disclosure has been described with reference to the above embodiments, the technical scope of the disclosure is not limited to the scope provided by the embodiments. Various modifications or improvements can be made to the embodiments, and those added with the modifications or improvements are also included in the technical scope of the disclosure. The components of the wearable-item size acquisition system 10 of the first and second embodiments may be implemented in combination with one another as appropriate.

For example, while a description has been made for the above embodiments on a mode in which a wearable item is defined as clothes, the disclosure is not limited to this, and a wearable item may be a pair of socks, a pair of gloves, a pair of shoes, a hat, a pair of ski boots, a pair of snowboard boots, or other wearable item as long as it is worn by an estimation subject.

The wearable-item size acquisition system 10 may be provided with means for an estimation subject feeding back a calculated match probability and whether a result of estimating an estimation clothing size was appropriate or not. Accordingly, subject biological information of an estimation subject and a clothing size that the estimation subject determined to be appropriate are registered in the size database 62. The information to feed back may further be added with information on clothes (e.g. the maker, brand, model number, or design of the clothes) actually tried on or purchased by an estimation subject.

While a description has been made for the above embodiments on a mode in which the server 16 or the measuring device 12 executes the clothing size estimation process, the store terminal 14 or the user terminal 18 may execute it. In this mode, the store terminal 14 or the user terminal 18 receives subject biological information from the measuring device 12 and executes the clothing size estimation process based on the subject biological information. The size database 62 is downloaded from the server 16 to the store terminal 14 or the user terminal 18 as appropriate, and is stored in the store terminal 14 or the user terminal 18. The user database 68 of the second embodiment may be stored in the user terminal 18 instead of the server 16.

While in the above embodiments each of a plurality of pieces of body composition data is associated with a piece of size data in the size database 62, each piece of body composition data may further be associated with a piece of design data related to clothing design including at least one of a color, a pattern, and the like. For example, each of a plurality of pieces of body composition data is associated with a piece of size data along with a piece of design data of clothes expected to be appropriate for a body shape estimated from body composition which is subject biological information. Specifically, for example, body composition data from which a plump body shape is estimated is associated with a contractive color as the color (design data), and body composition data from which a plump body shape is estimated is associated with a stripe as the pattern (design data).

The design data, along with estimated size data, is then displayed on the touch-panel display 20 of the measuring device 12 for presentation to the estimation subject. A piece of body composition data may be associated with a plurality of pieces of design data, and one or a plurality of pieces of design data may be presented to an estimation subject based on the estimation subject's history of past purchases.

While a description has been made for the above embodiments on a mode in which the clothing size estimation unit 54 estimates a clothing size, the embodiments are not limited to this, and the clothing size estimation unit 54 may estimates a clothing design based on an estimation subject's subject biological information in a manner similar to the above-described methods of estimating a clothing size for an estimation subject.

In this mode, the storage 50 stores a database containing a plurality of pieces of body composition data each associated with a piece of design data (hereinafter referred to as the "design database"). Based on subject biological information and the design database, the clothing size estimation unit 54 estimates a clothing design for an estimation subject using, for example, above-described (1) Estimation based on Euclidean distance, (2) Estimation from a neighbor data group, and (3) Estimation from a density-based cluster.

The estimated design data is then displayed on the touch-panel display 20 of the measuring device 12 for presentation to the estimation subject. A plurality of pieces of design data may be estimated for an estimation subject, and one or a plurality of pieces of design data may be presented to an estimation subject based on the estimation subject's history of past purchases.

Also in this mode, the appropriateness calculation unit 56 may determine whether an estimated clothing design is appropriate for an estimation subject or not in a manner similar to the above-described methods of determining whether a clothing size for an estimation subject estimated by the clothing size estimation unit 54 is appropriate for the estimation subject or not. Understandably, the appropriateness calculation unit 56 may determine only match probability instead of both match probability and a correction index described above.

DESCRIPTION OF THE SYMBOLS

10: Clothing size acquisition system
12: Measuring device
50: Storage (Storage means)
52: Body composition data acquisition unit (Biological information acquisition means)
54: Clothing size estimation unit (Wearable-item size estimation means)
56: Appropriateness calculation unit (Appropriateness calculation means)
62: Size database (Database)
70: Size-change time estimation unit (Size-change time estimation means)

The invention claimed is:

1. A wearable-item size acquisition system comprising:

biological information acquisition means for acquiring subject biological information indicating biological information of an estimation subject;

storage means for storing a plurality of pieces of biological information each associated with a wearable-item size indicating a size of a wearable item worn by the estimation subject; and wearable-item size estimation means for estimating the wearable-item size for the estimation subject based on the subject biological information acquired by the biological information acquisition means via a communication connection and on the plurality of pieces of biological information stored in the storage means, wherein the wearable-item size estimation means estimates the wearable-item size for the estimation subject based on the wearable-item size corresponding to the neighborhood biological information of the subject biological information extracted from biological information of other individuals in the plurality of pieces of biological information stored in the storage means, wherein the subject biological information is biological information measured by a body composition analyzer that measures body composition based on bioimpedance of the estimation subject, wherein the biological information is at least two of fat percentage, fat mass, fat-free mass, muscle mass, visceral fat mass, visceral fat level, visceral fat area, subcutaneous fat mass, basal metabolic expenditure, bone mass, body water percentage, BMI, intracellular fluid volume, and extracellular fluid volume, wherein the storage means stores the plurality of pieces of biological information each associated with the wearable-item size as a database, and the database is sequentially updated by addition of a new piece of biological information associated with the wearable-item size, wherein the database is represented in a multidimensional space defined by axes of the plurality of pieces of biological information, and wherein the wearable-item size estimation means estimates a piece of size data corresponding to a piece of body composition data whose Euclidean distance from a piece of the subject biological information is the smallest as the wearable-item size for the estimation subject.

2. The wearable-item size acquisition system according to claim 1, comprising appropriateness calculation means for calculating appropriateness of the wearable-item size estimated by the wearable-item size estimation means for the estimation subject.

3. The wearable-item size acquisition system according to claim 2, wherein the appropriateness calculation means calculates as the appropriateness a probability that the wearable-item size estimated by the wearable-item size estimation means is the wearable-item size for the estimation subject based on the plurality of pieces of biological information stored in the storage means.

4. The wearable-item size acquisition system according to claim 3, wherein the appropriateness calculation means calculates the probability from a ratio or distribution of the wearable-item size associated with pieces of biological information that are among the plurality of pieces of biological information stored in the storage means and are included in a predetermined range defined with respect to the subject biological information.

5. The wearable-item size acquisition system according to claim 3, wherein the appropriateness calculation means calculates as the appropriateness a correction index that is a difference between a representative value of the biological information for the wearable-item size estimated by the estimation means and the subject biological information or a difference between a representative value of measurements for the estimated wearable-item size and a measurement obtained from the subject biological information.

6. The wearable-item size acquisition system according to claim 4, wherein the appropriateness calculation means calculates as the appropriateness a correction index that is a difference between a representative value of the biological information for the wearable-item size estimated by the estimation means and the subject biological information or a difference between a representative value of measurements for the estimated wearable-item size and a measurement obtained from the subject biological information.

7. The wearable-item size acquisition system according to claim 2, wherein the appropriateness calculation means calculates as the appropriateness a correction index that is a difference between a representative value of the biological information for the wearable-item size estimated by the estimation means and the subject biological information or a difference between a representative value of measurements for the estimated wearable-item size and a measurement obtained from the subject biological information.

8. The wearable-item size acquisition system according to claim 7, wherein the appropriateness calculation means calculates a probability that the wearable-item size estimated by the wearable-item size estimation means is the wearable-item size for the estimation subject based on the plurality of pieces of biological information stored in the storage means, and calculates the representative value based on the biological information and the probability.

9. The wearable-item size acquisition system according to claim 1, wherein the wearable-item size for the estimation subject estimated by the wearable-item size estimation means is displayed on image display means.

10. The wearable-item size acquisition system according to claim 1, comprising size-change time estimation means for estimating a time when the wearable-item size for the estimation subject changes, based on the subject biological information acquired before and the subject biological information acquired newly.

11. The wearable-item size acquisition system according to claim 1, wherein the wearable item is clothes of the estimation subject.

12. A computer-readable non-transitory storage medium storing a wearable-item size acquisition program for causing a computer to function as wearable-item size estimation means for, based on a plurality of pieces of biological information each associated with a wearable-item size indicating a size of a wearable item worn by an estimation subject and on biological information of the estimation subject acquired by biological information acquisition means via a communication connection, estimating the wearable-item size for the estimation subject, wherein the wearable-item size acquisition program is stored in a computer-readable non-transitory storage medium, wherein the wearable-item size estimation means estimates the wearable-item size for the estimation subject based on the wearable-item size corresponding to the neighborhood biological information of the biological information of the estimation subject extracted from biological information of other individuals in the plurality of pieces of biological information stored in a storage means, wherein the biological information of the estimation subject is biological information measured by a body composition analyzer that measures body composition based on bioimpedance of the estimation subject, wherein the biological information is at least one two of fat percentage, fat mass, fat-free mass, muscle mass, visceral fat mass, visceral fat level, visceral fat area, subcutaneous fat mass, basal metabolic expenditure, bone mass, body water percentage, BMI, intracellular fluid volume, and extracellular fluid volume, wherein the storage means stores the plurality of pieces of biological information each associated with the wearable-item size as a database, and the database is sequentially updated by addition of a new piece of biological information associated with the wearable-item size, wherein the database is represented in a multidimensional space defined by axes of the plurality of pieces of biological information, and wherein the wearable-item size estimation means estimates a piece of size data corresponding to a piece of body composition data whose Euclidean distance from a piece of the subject biological information is the smallest as the wearable-item size for the estimation subject.

* * * * *